Oct. 15, 1940.    K. S. WEAVER    2,218,253
METHOD AND MEANS FOR MEASURING COLOR
Filed Feb. 23, 1938    2 Sheets-Sheet 1
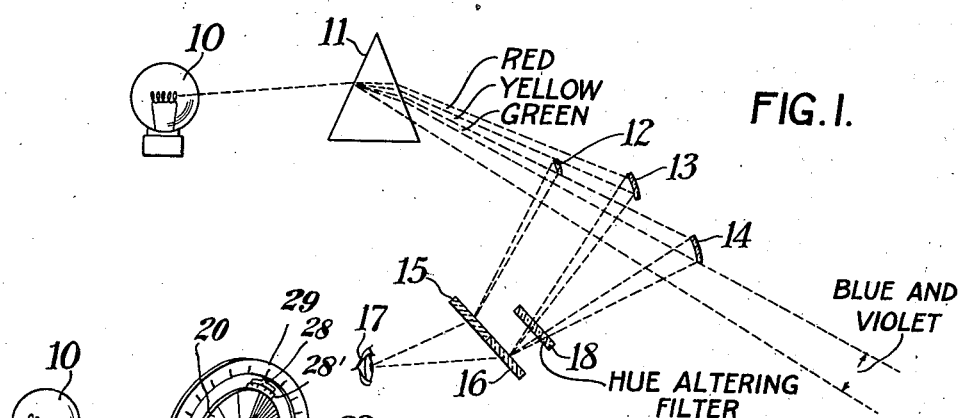
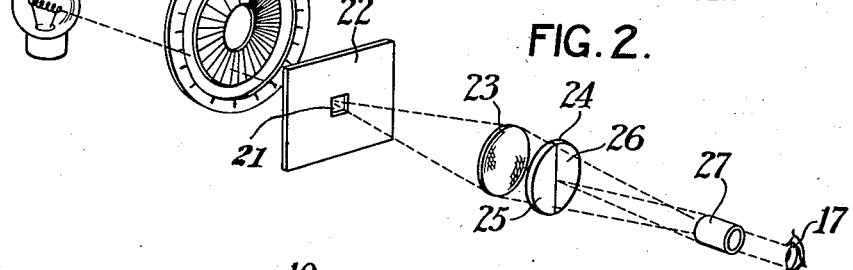
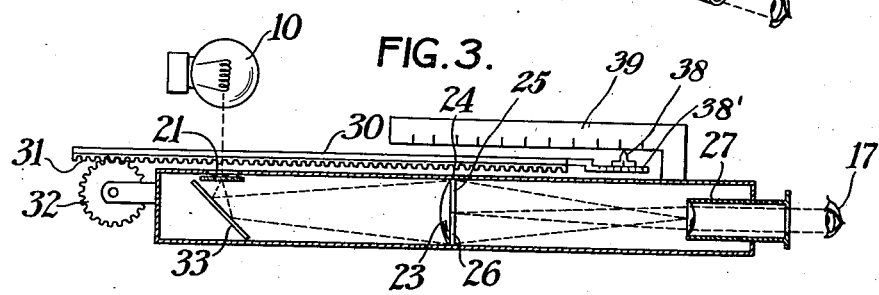
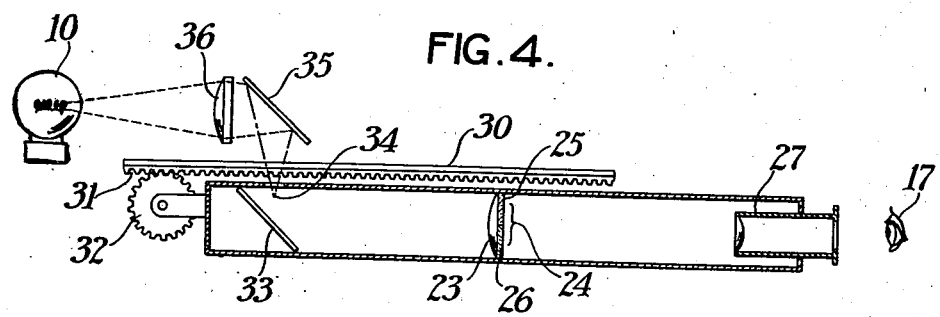
Karl S. Weaver
INVENTOR
BY
ATTORNEYS Karl S. Weaver
INVENTOR Patented Oct. 15, 1940

2,218,253

UNITED STATES PATENT OFFICE 2,218,253

METHOD AND MEANS FOR MEASURING COLOR

Karl S. Weaver, Rochester, N. Y., assignor to Eastman Kodak Company, Rochester, N. Y., a corporation of New Jersey Application February 23, 1938, Serial No. 191,977

9 Claims. (Cl. 88—22.5)

This invention relates to optical instruments and particularly to instruments such as optical pyrometers for the measurement of color temperature.

It is an object of the invention to provide a method and means for measuring the color temperature of luminous bodies (i. e. objects radiating light by emission, transmission or reflection).

It is a particular object of the invention to provide a method and means for this purpose which do not require any auxiliary light source for comparison purposes.

In general, optical pyrometers determine the temperature and hence by calculation the color temperature of a luminous object by measuring the total energy emitted, the energy emitted over a given spectral region or the energy emitted at one wavelength. The present invention is quite different from such devices and is more properly called a color temperature meter since the spectral distribution of the energy and hence the color is the quantity that is measured.

Physicists have divided the characteristic known as color into three parts—brilliance, color saturation and color hue—and have given scientifically exact definitions to these terms. The present invention depends on the comparison of color hues which term will be used in its broad but proper sense throughout this specification and accompanying claims. Hue depends on two factors, the spectral distribution of the light being studied and the trichromatic responses of the human eye. It is possible to have two light beams which have different spectral composition but which cause identical trichromatic responses and hence have the same hue. Changes in saturation or brilliance are not detrimental to the invention and although at present such changes appear to be of little practical use, the manner in which they could be used and the effect they would have will be discussed in detail in connection with Fig. 7.

According to the present invention light coming from a luminous object is examined by comparing two portions which have different spectral composition but the same hue. As will be pointed out below, the choice of these two portions may be made in any arbitrary manner and a measure of this choice on an arbitrary scale is a measure of the color (color temperature) of the source. "Color temperatures" are the values (in degrees of temperature) assigned to certain "colors" whose spectral composition is according to the black body radiation laws. The present invention depends on the fact that any one of such "colors" can have only one certain spectral composition. When the luminous object examined is not a black body (e. g. a reflecting screen) the resulting color value is that of a black body which is equivalent to the screen over the spectral regions tested, but since the invention is most useful and usually used with incandescent bodies (which almost always approximate black bodies) it is customary to refer to the resulting values as "color temperatures" which as defined above are a particular group of "colors."

In the preferred embodiment of the invention two portions of light having different spectral composition and the same hue for a given color (temperature) of the source are compared. By any known means such as a suitable filter wedge, the apparent color (temperature) of the source is then varied until a hue match is established and the adjustment of the wedge is noted as a measure of the amount by which it is necessary to change the apparent color (temperature) of the source and hence as a measure of the color (temperature) of the source. Such wedges are well known and are of a reddish or bluish hue depending on whether a reduction or increase of effective color temperature is desired. From another point of view this embodiment of the invention is exactly the same as the broad form described in the preceding paragraph since the portions compared have different spectral composition and the same hue. The wedge merely cooperates with and is part of the means for controlling the spectral composition, which means may be a prism with diaphragms, a polariscope, a filter, a combination of filters, or any equivalent means.

The hue adjusting means such as a filter wedge may act on either portion of the light being examined or on both as in this preferred embodiment.

As means for controlling the spectral composition, I prefer to use a dichroic filter for one portion of the light and a filter transmitting a spectral region intermediate to the two regions of the dichroic filter for the other portion. It is relatively easy to choose a yellow filter which, for illumination of a certain color (temperature) has substantially the same hue as a dichroic filter transmitting red and green, but it is not possible to match the hue of a saturated green filter with that of a filter transmitting both red and blue. This latter effect is due to the circular arrangement of the eye responses which results in the magenta or purple hues which have no counterpart in the natural spectrum. There is some definite evidence that the most successful matching of hues for colors having different spectral composition is obtained when only the red and green trichromatic responses are affected, but colors in the green and blue regions only will also work. Furthermore, the sensitivity of the normal eye to change in hue is greatest in the green and red regions. For these two reasons, I prefer to use the long wave length half of the visible spectrum for my invention.

The various combinations of colors which will not work are avoided by confining oneself to the comparison of colors which have substantially the same hue but different spectral composition. As will be pointed out, the matching of two hues is made easier and more precise when the two fields reach approximate saturation balance at the same time as they reach hue balance.

Other objects and advantages of the invention will be apparent from the following description when read in connection with the accompanying drawings in which:

Fig. 1 illustrates the principle of the invention.

Fig. 2 illustrates a preferred embodiment of the invention using a dichroic filter.

Fig. 3 is a modification of the embodiment shown in Fig. 2.

Fig. 4 is also a variation of the embodiment shown in Fig. 2.

Figure 5:
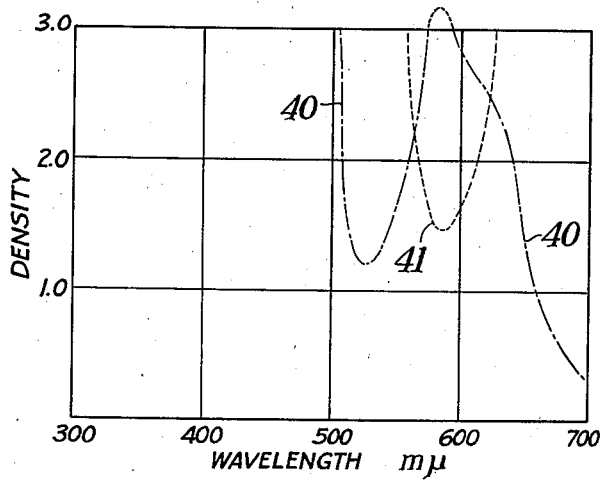
Fig. 5 shows the absorption curves of the filters used in the embodiments of Figs. 2, 3, and 4.

In Fig. 1 a luminous object shown as a lamp 10 emits a continuous spectrum which is broken up by a prism 11 in the usual manner. As pointed out above, I prefer to use only the red and green regions of the spectrum and hence the blue and violet portions are masked off or allowed to go to one side. The yellow portion is reflected by a mirror 12 to one half 15 of a comparison field. The mirror 12 is shown as a concave mirror to focus the light on this portion 15 so that there will be no spectral variations over this field. However, any suitable optical means for accomplishing this purpose may be used. The red and green portions of the spectrum are also brought to focus by means of mirrors 13 and 14 in the field of view. The resulting color appears in the second half 16 of this field.

When the two halves 15 and 16 of the field are compared by an eye 17 they will, in general, not have the same hue, but for each color temperature of the source 10 there is a certain combination of red and green spectral regions as picked out by the mirrors 13 and 14 which will match some yellow region as picked out by the mirror 12. In the arrangement shown the yellow region is selected by a mirror 12, but the red and green regions are selected not only by mirrors 13 and 14 but also by a hue altering filter 18 which cooperates therewith.

If this device is calibrated for known color temperatures of the source 10 in terms of the adjustment of the hue altering filter 18 or in terms of what hue altering filter is used, the color (temperature) of any unknown luminous body can be measured therewith.

The selection of the light portions may be made by adjustment of the mirrors 12, 13, and 14, but I have found it more practical to leave fixed the adjustment of the light selecting means and use some form of hue altering filter.

Preferably, satisfactory results may also be obtained with a hue altering filter which affects both beams, i. e. the beams reaching both halves 15 and 16 of the comparison field. One such arrangement wherein the hue altering filter is in the form of a color wedge capable of changing the effective color temperature of the source and is placed relatively near the source, is described in the following embodiment. One decided advantage in having a hue altering filter which acts simultaneously on both fields is that the relative brightness of both fields remains always the same.

In Fig. 2 there is shown a preferred embodiment of the invention which in its simplest form consists only of a two-color filter 24 having a yellow portion 25 and a dichroic portion 26 transmitting red and green. Forgetting, for a moment, the rest of the optical system, the eye 17 may examine the source 10 through this two-color filter 24. For a given color temperature of the source 10 this filter 24 will consist of two portions 25 and 26 which have the same hue. Thus the two filters above may be used for determining whether or not the color temperature of the source 10 is a certain value and also whether or not its temperature is above or below this certain value. If the temperature of the source 10 is above that for which the two portions 25 and 26 have the same hue, the dichroic portion 26 will appear greener than the yellow portion 25. If the temperature of the source 10 is below the critical temperature the dichroic portion will appear redder than the other portion. By altering the voltage on the lamp 10 it may be brought to the critical temperature.

Merely for convenient viewing of the comparison fields 25 and 26, I provide an optical system consisting of a ground glass surface 21 in a shield 22, a field lens 23 and an eye-piece 27 which is adjustable to accommodate the eye 17. The eye-piece 27 collimates the light from the filter 24 for a normal eye and the field lens 23 placed immediately adjacent to the filter 24 focuses the light from the ground glass surface 21 in the eye-piece 27 to give maximum brightness in the usual way.

According to the invention, in order to employ this device for the measurement of any color temperature within a given range, I provide a filter wedge 20 which is capable of altering the effective color temperature of the source 10. As is well known, such a wedge may vary from a deep reddish hue to perfectly clear, from clear to a bluish hue or through both ranges depending on what change in color temperature is desired. The choice of filter wedge will depend upon what filters are chosen for the fields 25 and 26. Satisfactory results are obtainable with a filter 24 whose fields match at a color temperature lower than anything which is to be measured and a filter wedge 20 which is reddish in hue.

In practice, the setting of the filter wedge 20 is calibrated against various standard color temperatures of the source 10. It is possible but not desirable to have the temperatures marked directly on a scale 29 and index 28 accompanying the filter 20. This undesirability is due to the fact that the setting of this filter is slightly different for some people. Since the adjustment of the filter 20 depends on the trichromatic responses of the eye (in the specific example chosen, on the red and green responses) any slight variation in the relative sensitivity of the responses from that of the normal eye would cause the operator to get a slightly different reading on the scale. However, practically all eyes are normal and hence respond substantially the same, and those whose relative responses are slightly different from normal may add a personal correction factor to the calibration scale or draw up a calibration scale of their own. On the other hand, those persons who are color blind to the extent that the relative sensitivity of their red and green responses are considerably different from the normal must, of course, forego the privilege of being able to measure color (temperature) with my invention, when it is made up for use with a normal eye. If the color blind person is not completely lacking in either the red or green responses, it should be possible to make up a special instrument according to my invention and suitable for his eyes.

In some cases a scale reading directly in color temperatures may be used with the index 28 adjustable as along a scale 28' to take care of the personal correction factor which appears to be approximately uniform. In fact the scale may read directly in any arbitrary units such as filter members to be used in color photography when the color of the illumination is tested.

In Fig. 3 there is shown a side elevation of an embodiment similar to that in Fig. 2 except that the light from the ground glass surface 21 is reflected by a mirror 33 to the lens 23 and the filter wedge is linear in form as shown at 30 and is adjustable by means of a rack and pinion 31 and 32. The wedge filter 30 carries an index 38 which is readable against a suitable linear scale 39 mounted on the body of the instrument. With each instrument there is provided a calibration curve of this scale against color temperatures of the source 10 for a normal eye 17 or the index 38 may be adjustable as along a scale 38' in the same way as 28 in Fig. 2 is adjustable to take care of the personal correction factor.

In Fig. 4 is shown a modification of the arrangement shown in Fig. 3 in which the ground glass 21 is eliminated. Light from the source 10 is brought to focus by means of a lens 36 and a mirror or prism 35 to a point 34 which is coincident with the point formerly occupied by the ground glass 21.

In the arrangement shown in Fig. 3 the intensity of the light falling on the ground glass 21 varies, according to the inverse square law, with the distance from the light source 10. This varies the brightness of the field as seen by the eye 17. This change in brightness is absent from the arrangement shown in Fig. 4 provided the image at 34 as reimaged in the entrance pupil of the eye-piece 27 is larger than that entrance pupil. The two arrangements require slightly different calibration curves because the ground glass 21 is slightly selective in its scattering power.

The transmission of a suitable dichroic filter 26 is shown as curve 40 in Fig. 5. The transmission of a suitable yellow filter 25 is shown by the curve 41 in this figure. These curves are drawn in the customary manner and require no detailed explanation.

Figure 6:
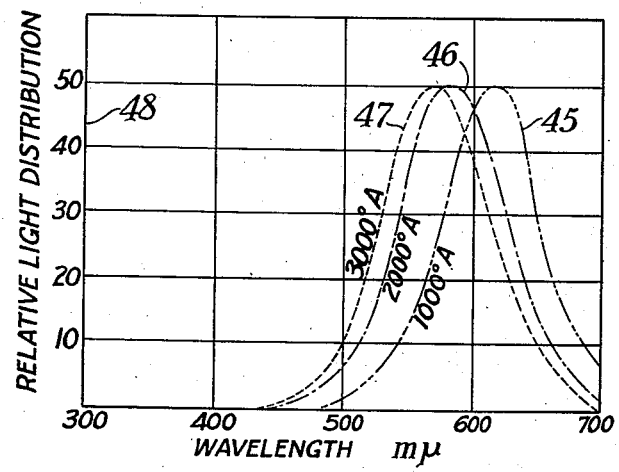
Fig. 6 shows the change with temperature of the light emitted by a luminous body.

Before discussing the effect as the color temperature changes, it is pointed out that the curves shown in Fig. 6 relate to the visible light emitted as the color temperature changes and are merely relative distribution curves. The values on the ordinate scale 48 have no absolute value and are different for the three curves. These curves are quite different from the black body radiation curves since they show only visible light distribution and hence involve the well-known visibility curve of the normal eye. As the temperature of the source changes from 1000 degrees absolute corresponding to the curve 45 to 2000 or 3000 degrees absolute corresponding to curve 46 or 47, the ratio of amount of green to red present in the emitted light increases greatly as shown in Fig. 6. Referring to Fig. 5 one notices that this change in relative amounts of red and green will have only a slight effect on the hue of the yellow filter as shown by the curve 41, but will have enormous effect on the hue of the dichroic filter shown by the curve 40 since it will change from a decided reddish hue over to a decided greenish one. At a certain color temperature the hue of this dichroic filter will exactly or at least practically match that of the yellow filter 25 shown by the curve 41. Various types of dichroic filters are known and any of them are satisfactory for purposes of my invention if a suitable intermediate filter can be secured having substantially the same hue at a color temperature near the range which is to be measured. The choice of which filters to use should be made according to the exactness with which a hue match can be made.

Figure 7:
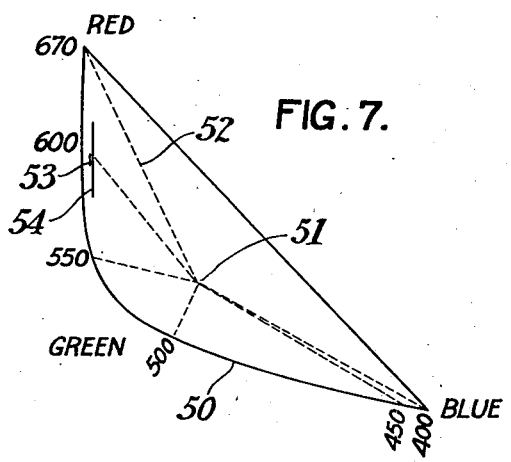
Fig. 7 shows graphically the effect of the invention.

Fig. 7 shows "The color triangle" well known to everyone skilled in this art. This figure shows the form recommended by the 1920 Optical Society of America Committee on Colorimetry as reproduced on page 306 of "The Principles of Optics" by Hardy and Perrin (International Series in Physics). As is well known, pure spectral colors fall on the curve 50 as marked in (millimicrons) wavelength, "white" appears as the point 51 and all colors of constant hue but varying saturation form broken lines such as 52 from the curve 50 to the point 51. Using the term chromaticity to define both hue and saturation, it will be noted that the chromaticity of the yellow filter 25 falls on the short line 53 and moves along this line (i. e. is almost constant) with change in color temperature. The chromaticity of the dichroic filter 26 moves along the line 54 with change in color temperature of the illumination and at one color temperature has the same hue and almost exactly the same saturation as the filter 25.

It will be seen from this chart (Fig. 7) that the two filters, 25 and 26, are practically saturated; in fact the distance between the lines 53 and 54 and the curve 50 is exaggerated for convenience. It will also be seen that the change in chromaticity is almost entirely one of hue, the saturation being constant. However, the change may include some change in saturation or conceivably might even be entirely a change in saturation. A match between any two variable color fields is possible if the straight lines or curves representing the change, cross on this diagram and if the two functions simultaneously reach the point of intersection.

Measurements of change in saturation only are not practical nor would they be as accurate as measurements of change in hue. However, although the present invention as defined by the accompanying claims requires a change in hue, a change in saturation is not usually detrimental and may even assist providing the saturation balance and hue balance are reached simultaneously. For obvious reasons it is also desirable that the comparison fields also have the same brilliance when matched and hence any hue altering wedge as discussed above should preferably act on both portions of the light rather than on one portion only.

In searching through the literature relating to pyrometry, I have come across a very interesting article relating to a device whose purpose is the same as the present invention. This article is interesting not only because the writer was attempting to accomplish this purpose and was experiencing some difficulties which he described in detail, but also because the present invention can be applied with success and in a simple manner to the device and would minimize and almost completely eliminate these difficulties. I refer to "A new study of the leucoscope and its application to pyrometry," by Erwin G. Priest, page 448, Journal of the Optical Society of America, volume 4, 1920. In this article Priest reviews the work that had been done relative to the use of a leucoscope for the measurement of color temperature. Such an arrangement differs from the present invention in its most essential point. With the leucoscope one does not compare colors having the same hue, rather one dilutes the colors and in general, as pointed out by Priest one finally matches a very pale yellow with a very pale blue especially at high temperatures such as those for which the present invention is used.

From a theoretical point of view this difficulty which appears with the leucoscope apparently depends on the fact that Priest and other users permitted the use of light affecting both the red and blue trichromatic responses of the eye. As pointed out previously no color giving any appreciable amount of trichromatic response for both red and blue can be matched in hue.

The present invention could be applied quite simply to the leucoscope with a certain degree of success by merely placing somewhere in the optical system a yellowish filter cutting out blue and violet. The reddish wedge used in the embodiment shown in Fig. 3 would serve this purpose. As before we could use a bluish filter and confine the comparison to the blue end of the spectrum but this is less preferable. A suitable thickness of quartz must be chosen so that two spectral regions included in one beam are relatively close together (say red and green to correspond to the dichroic filter case discussed above) and the other beam intermediate thereto (say yellow). By not using any filtering means, Priest necessarily included other colors in each of these beams which resulted in appreciable trichromatic response to the blue and hence the difficulties which he described periodically through his paper. Furthermore, it is obvious from this why Priest was more successful in measuring low red heats containing a minimum of blue light.

On the other hand even if the present invention were applied to the leucoscope by introducing a yellow filter to the optical system, the resulting embodiment of the invention is less preferred than any of those described previously, partly because the leucoscope requires very expensive parts of necessarily high accuracy and mainly because the leucoscope as means for determining spectral composition does not give spectral portions for which the hue match is as exact as that obtained with filters and because the hue which is matched changes. That is, the leucoscope system is analogous to an arrangement similar to Fig. 1 but eliminating the filter 18 and depending for adjustment on an equal shift of the mirrors 12, 13 and 14 through the spectrum, except that the mirrors would give a much sharper and probably better cut (i. e. spectral selection). Any embodiment such as in Figs. 2, 3, and 4 wherein the final hue match is always for the same hue is much preferable since the ability to match hues of different spectral composition varies greatly through the spectrum. As pointed out above this preferred embodiment usually requires a filter wedge for varying effective color temperature.

Having thus described various embodiments of my invention, the principle thereof and the manner in which it may be applied with various devices for controlling spectral composition, I wish to point out that the effect is not limited to the specific arrangements, but is of the scope of the appended claims.

What I claim and desire to secure by Letters Patent of the United States is:

1. The method of obtaining an indication corresponding to the color temperature of a luminous object which comprises directing to adjacent fields of view two portions of the light from the object which portions have different spectral composition and have the same hue for one color temperature only, filtering said light through a calibrated adjustable wedge color filter whose color is substantially that which changes one black body radiation color to another, adjusting said wedge until said adjacent fields of view appear to have the same hue and noting the amount of this adjustment.

2. The method of obtaining an indication corresponding to the color temperature of a luminous object which comprises directing to adjacent fields of view two portions of the light from the object, filtering one of said portions through a dichroic filter, filtering the other portion through a color filter whose hue is the same as the dichroic filter for light of one color temperature only filtering both portions through a calibrated adjustable wedge color filter whose color is substantially that which changes one black body radiation color to another, adjusting the wedge until the two fields of view appear to have the same hue and noting the adjustment of the wedge.

3. A device for measuring color temperature of a luminous object which comprises a housing having a light channel therethrough for transmitting light from the object, a filter wedge adjustably carried by the housing in line with and covering the light channel, said filter wedge being the color which changes one black-body radiation color to another, means carried by the housing for adjusting said wedge, two color filters carried by the housing positioned laterally adjacent to each other and covering the light chanel whereby all light transmitted through said channel passes through said filter wedge and said two color filters, one of said color filters transmitting only light substantially within a relatively small region of the spectrum and the other of said color filters transmitting a substantial amount of light on each side of said region and having the same hue as the other filter for one color temperature only and scale means for indicating the adjustment of the wedge.

4. A device for measuring color temperature of a luminous object comprising a housing having a channel therethrough for transmitting light from the object, a comparison field covering said channel and having two sections, a yellow filter carried by the housing in said channel for transmitting light from the object to one of said sections, a dichroic filter also carried by the housing in the channel for transmitting red and green light from the object to the other said sections, a filter wedge adjustably carried by the housing and covering said channel, the wedge being of a color which alters one apparent color temperature to another and means for adjusting the filter wedge, the yellow filter and the dichroic having the same hue for one color temperature only and scale means for indicating the adjustment of the wedge.

5. A device for measuring the color temperature of a luminous object comprising a housing having a channel therethrough for transmitting light from the object, a comparison field covering said channel and having two sections, color controlling means carried by the housing for receiving light from the object and transmitting to one of said sections light of a relatively narrow spectral region, a second color controlling means also carried by the housing for receiving light from the object and transmitting to the other section light of two spectral regions on opposite sides of said narrow spectral region and having the same hue as the light of said narrow spectral region for one color temperature only, a color filter wedge adjustably carried by the housing with a portion thereof in the path of the light reaching both sections for altering in accordance with the density of said portion of the wedge the relative intensities of the light of said two spectral regions and thereby altering the hue of the light reaching said other section, means for adjusting said wedge and moving different portions thereof into said light path until said hue matches that of said one of the sections and scale means for indicating the adjustment of the wedge.

6. A device according to claim 5 in which the color of the wedge is that which changes one black-body-radiation color to a color which also is substantially a black-body-radiation color.

7. A device acocrding to claim 5 having index means cooperating with the scale means for indicating the adjustment of the wedge relative to said light path, and means for adjusting said index means relative to the scale means without changing the adjustment of the wedge relative to the light path for correcting the reading of the scale means in accordance with the variation of the personal factor in hue matching response, whereby a user of the device may when taking the reading on a standard luminous object adjust the index so that the scale means is correctly calibrated for said user's eye.

8. A device for measuring the color temperature of a luminous object comprising a housing having a light channel therethrough for transmitting light from the object, a yellow filter and a dichroic filter carried by the housing adjacent to one another and covering said channel, said dichroic filter having substantially the same hue as the yellow filter for incident light of one color temperature only and an adjustable filter wedge carried by the housing to be moved across said channel and into the paths of the light going through each of the other filters, the color of the wedge being that which changes one black-body-radiation color to another color which also is substantially a black-body-radiation color, whereby the wedge may be adjusted until the light coming through the wedge and one of the filters has the same hue as that coming through the wedge and the other filter, and scale means for indicating the adjustment of the wedge.

9. A device according to claim 8 having index means cooperating with the scale means for indicating the adjustment of the wedge relative to the channel and means for adjusting in accordance with the variation of the personal factor in hue matching response the relative setting of the index and the scale means without changing the adjustment of the wedge relative to the channel whereby a user of the device may adjust the relation of the index to the scale so that the scale means is correctly calibrated for said user's eye.

KARL S. WEAVER.